Figures 1, 2:
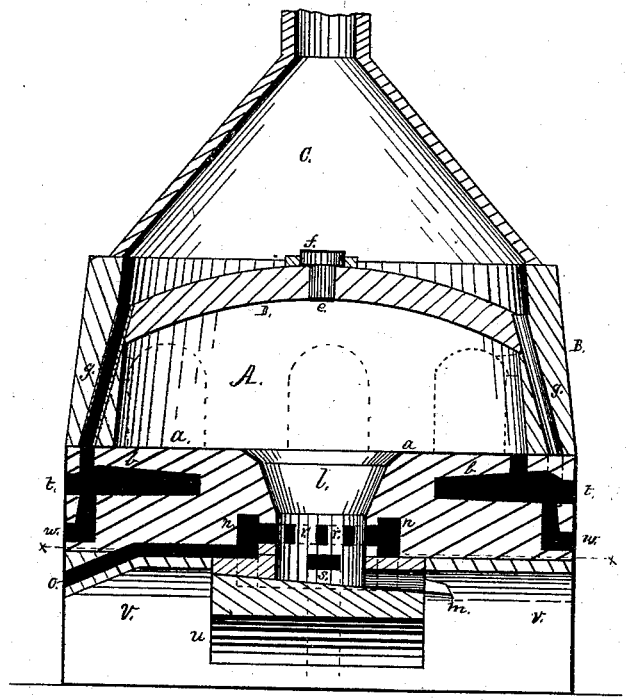

J. NICHOLSON, Jr.
GLASS FURNACE.

No. 171,241. Patented Dec. 21, 1875.

WITNESSES
James L. Johnston
A. C. Johnston

INVENTOR
John Nicholson

UNITED STATES PATENT OFFICE.

JOHN NICHOLSON, JR., OF PITTSBURG, PENNSYLVANIA.

IMPROVEMENT IN GLASS-FURNACES.

Specification forming part of Letters Patent No. 171,241, dated December 21, 1875; application filed April 5, 1875.

*To all whom it may concern:*

Be it known that I, JOHN NICHOLSON, Jr., of Pittsburg, in the county of Allegheny and State of Pennsylvania, have invented a new and useful Improvement in Glass-Furnaces; and I do hereby declare that the following is a full and exact description thereof, reference being had to the accompanying drawings and to the letters of reference marked thereon.

In the process of manufacturing glass it frequently occurs that the melting-pots crack and become leaky, allowing the molten glass to flow over the pot-bench, and from it into the fire-chamber of the furnace, where it commingles with the fuel and is lost. It also frequently occurs that the furnace becomes overheated, thereby subjecting the melting-pots to an undue heat, which injures them, and the molten glass in the pots becomes too thin for proper manipulation by the workmen. To remedy this state of things and reduce the temperature of the glass and furnace, a current of cold air, through the medium of a fan or other device, is directed into the glass-pots, or the fire is withdrawn from the furnace. This cooling-down process is very injurious to the pots and furnace, and also consumes much time, often keeping the glass-blowers, pressmen, and their attendants idle for hours, and therefore is a loss to the manufacturers and workmen, the latter often working by the piece. In the common construction of melting-furnaces for the manufacture of glass the bottom of the melting-pot rests on the bench of the furnace, so that the heat is not brought in contact with their bottoms other than by conduction; hence a longer time and a greater consumption of fuel is required to melt the glass and hold it in a fluid condition for working than would be demanded if the heat were more directly applied to the bottom of the pots. The fire-chamber of the melting-furnace used in the manufacture of glass is subjected to an intense heat, causing the fire-wall or lining to burn out; therefore repairs are frequently required, which repairs must be made while the furnace is in operation and in a highly-heated condition, and danger and accidents to the furnace and pots are attendant upon this repairing process.

Now, the object of my invention is, first, to provide the furnace with a combustion-chamber which serves at the same time as a receptacle for the waste glass from cracked or leaking pots; second, to provide means for reducing with ease and facility the temperature of the furnace when it becomes overheated; third, to provide means for applying heat in a more direct manner to the bottom of the pots; fourth, to provide means for supplying the combustion-chamber with air for mixing with the gases and smoke to effect their combustion.

The nature of my invention consists, first, in providing the melting-furnace with a combustion-chamber immediately under the pot-chamber where the smoke and gases from the fire are mixed with air and consumed before entering the pot-chamber. My invention also consists in providing the crown of the pot-chamber of the furnace with an opening and lid, whereby the temperature of the furnace may be reduced at pleasure by allowing the surplus heat to escape into the stack. My invention also consists in conveying the heat through the medium of flues under the bottom of the melting-pots after said heat has performed its office in the pot-chamber of the furnace. My invention also consists in surrounding the fire-chamber of the furnace with an air-chamber, for the double purpose of protecting the wall or lining of the fire-chamber, and for heating and admitting air into said fire-chamber.

To enable others skilled in the art to make and use my invention, I will proceed to describe its construction and operation.

In the accompanying drawings, which form part of my specification, Figure 1 is a vertical section of my improvement in furnaces for the manufacture of glass. Fig. 2 is a transverse section of the same at line $x\ x$ of Fig. 1.

In the accompanying drawings, A represents the melting or pot chamber of the furnace, and is provided with the ordinary pot-bench $a$, excepting that it is furnished with flues $b\ c\ d$, which are arranged in the bench directly under the pots. These flues have suitable openings $t\ w$, which are used for the purpose of cleaning them. B represents the walls of the furnace; C, its stack, and D the crown, in the center of which is an opening, $e$, having a lid or valve, $f$, which may be opened and closed by such means as is deemed best by the constructer. The opening $e$ is used for allowing the surplus heat of the furnace to escape into the stack C, which carries it off. $g$ are vertical flues, which are connected with the flues $c\,d$, and pass up through the crown D, so as to communicate with the stack C. $l$ represents the combustion-chamber, situated in the center of the furnace and below the level of the bench or floor $a$. This chamber is provided with a flue, S, communicating with the fire-chamber, through which the products of combustion are conveyed. It has also a series of openings, $r'\,r'$, &c., communicating with the air-space $n$, surrounding it, and communicating with the exterior, through which air is supplied. The heat, gases, and smoke entering this chamber are mixed with air, and the gases and smoke are consumed, generating an intense heat and clear flame, so that nothing but heat and flame enters the melting or pot chamber. This combustion-chamber also serves as a well or receptacle for the waste glass that may flow from cracked or leaking pots, the floor being so constructed that such waste glass will flow into the chamber. The air-chamber $n$ is furnished with a series of openings, $r$, which communicate with the well $l$. This air-chamber $n$ will prevent the wall or lining of the well from becoming overheated, thereby adding greatly to the durability of the same. $s$ represents the opening for the inlet of the heat or gas from the furnace or gas-generator. The masonry which supports the well $l$ is provided with an arch, $u$. $v$ represents the cave which surrounds the well $l$.

From the foregoing description, and by reference to the accompanying drawings, the skillful mechanic will readily understand the construction, arrangement, and the relation that the several parts bear to each other of my improvement in furnaces for the manufacture of glass.

I will therefore briefly describe its operation, which is as follows: The gas from a generator passes into the well $l$ through openings S, and is ignited, furnishing the necessary heat in the chamber A, which heat, having performed its office in the chamber A, passes down into the flue $b$, and from it into flues $c\,d$, and from them up through flues $g$ into the stack C. The heated air, passing from chamber $n$ through openings $r$, will commingle with the gas flowing into the well $l$, and will add heat and aid in the combustion of the gas in well $l$ and pot-chamber A.

It will be observed that when the heat has performed its office in the chamber A it is made to act on the bottom of the pots prior to entering the exit-flues $g$, thereby more perfectly utilizing the heat, which will save fuel and time in the manufacture of glass.

In the event of the furnace becoming overheated, which is often the case, the operator can with ease and facility reduce the temperature by raising the lid or valve $f$ of the opening $e$, which will allow the surplus heat to escape into the stack C.

By this arrangement of the opening $e$ and its lid or valve $f$ the operator can have perfect control over the temperature of the furnace, whereby time and loss of labor are saved the manufacturer and workmen.

In case a pot or pots should break or become leaky the glass which flows from it or them will run into the well $l$, from which it can be drawn off by means of the spout $m$ and saved.

It will readily be observed that the improvements herein described are applicable to furnaces used in the manufacture of steel, iron, brass, &c. Therefore I do not confine myself to their use in furnaces for the manufacture of glass.

In relation to the damper, I do not claim it broadly, but limit my claim to the specific function it possesses of relieving the pot-chamber from the excess of heat accumulated therein.

Having thus described the object, nature, and operation of my improvement, what I claim as of my invention is—

1. In a melting-furnace for the manufacture of glass, the combustion-chamber $l$, provided with air-openings $r$, and surrounded with the air-space $n$, in combination with the pot-chamber and fire-chamber, substantially as and for the purpose hereinbefore described and set forth.

2. In a melting-furnace for the manufacture of glass, the crown D, provided with the opening $e$ and valve $f$, in combination with the stack and pot or melting chamber, substantially as and for the purpose hereinbefore described and set forth.

3. In a melting-furnace for the manufacture of glass, the flues $b\,c\,d$ under the melting-pots, so arranged that the heat passes from the chamber A through flue $b$, circulates under the pots through the flues $c\,d$, and escapes through the flue $g$, substantially as described and set forth.

JOHN NICHOLSON, JR.

Witnesses:
JAMES J. JOHNSTON,
A. C. JOHNSTON.